United States Patent [19]
Hebel et al.

[11] Patent Number: 6,073,177
[45] Date of Patent: Jun. 6, 2000

[54] DYNAMIC METHOD FOR CONNECTING A CLIENT TO A SERVER APPLICATION

[75] Inventors: Larry D. Hebel, Allen; Dale G. Gutt; Ronny K. Horn, both of Plano; Bao D. Hoang, Dallas, all of Tex.

[73] Assignee: Sterling Software, Inc., Dallas, Tex.

[21] Appl. No.: 08/906,842

[22] Filed: Aug. 5, 1997

Related U.S. Application Data

[60] Provisional application No. 60/023,189, Aug. 5, 1996.

[51] Int. Cl.[7] ...................................................... G06F 13/00
[52] U.S. Cl. .......................... 709/228; 709/227; 709/203; 709/230; 709/249; 370/429
[58] Field of Search .............................. 395/200.57, 682; 380/49; 709/228, 227, 203–207, 230, 249, 103, 220; 370/429

[56] References Cited

U.S. PATENT DOCUMENTS

| | | | |
|---|---|---|---|
| 5,231,633 | 7/1993 | Hluchyj et al. | 370/429 |
| 5,377,354 | 12/1994 | Scannell et al. | 709/103 |
| 5,657,390 | 8/1997 | Elgamal et al. | 380/49 |
| 5,758,084 | 5/1998 | Silverstein et al. | 709/228 |
| 5,761,507 | 6/1998 | Govett | 395/200.57 |
| 5,825,890 | 10/1998 | Elgamal et al. | 395/682 |

OTHER PUBLICATIONS

Martin, James, "*Information Engineering Book III Design and Construction*", Table of Contents, Chapter 1, and Chapter 2, pp. 3–37, 1990.

Douglas E.Comer (Internetworking with TCP/IP), Jan. 1995.

Kris Jamsa ( Internet Programming), Jan. 1995.

*Primary Examiner*—Glenton B. Burgess
*Assistant Examiner*—Chuong Ho
*Attorney, Agent, or Firm*—Baker Botts L.L.P.

[57] ABSTRACT

A dynamic data synchronization network is provided wherein a plurality of workstations 11 are coupled to a common server 13 using a network 15. The workstations are capable of generating data such as a design model or portions of a design model. The server 13 stores a master of the design model and provides a copy to the workstations 11 for review and update. The input from the workstations to the server is controlled by access locking to permit only selective access to the master copy at the server to thereby keep synchronization. That access can be on the basis of objects in the data of the server. The present application is directed to the method of enrolling the clients.

13 Claims, 7 Drawing Sheets

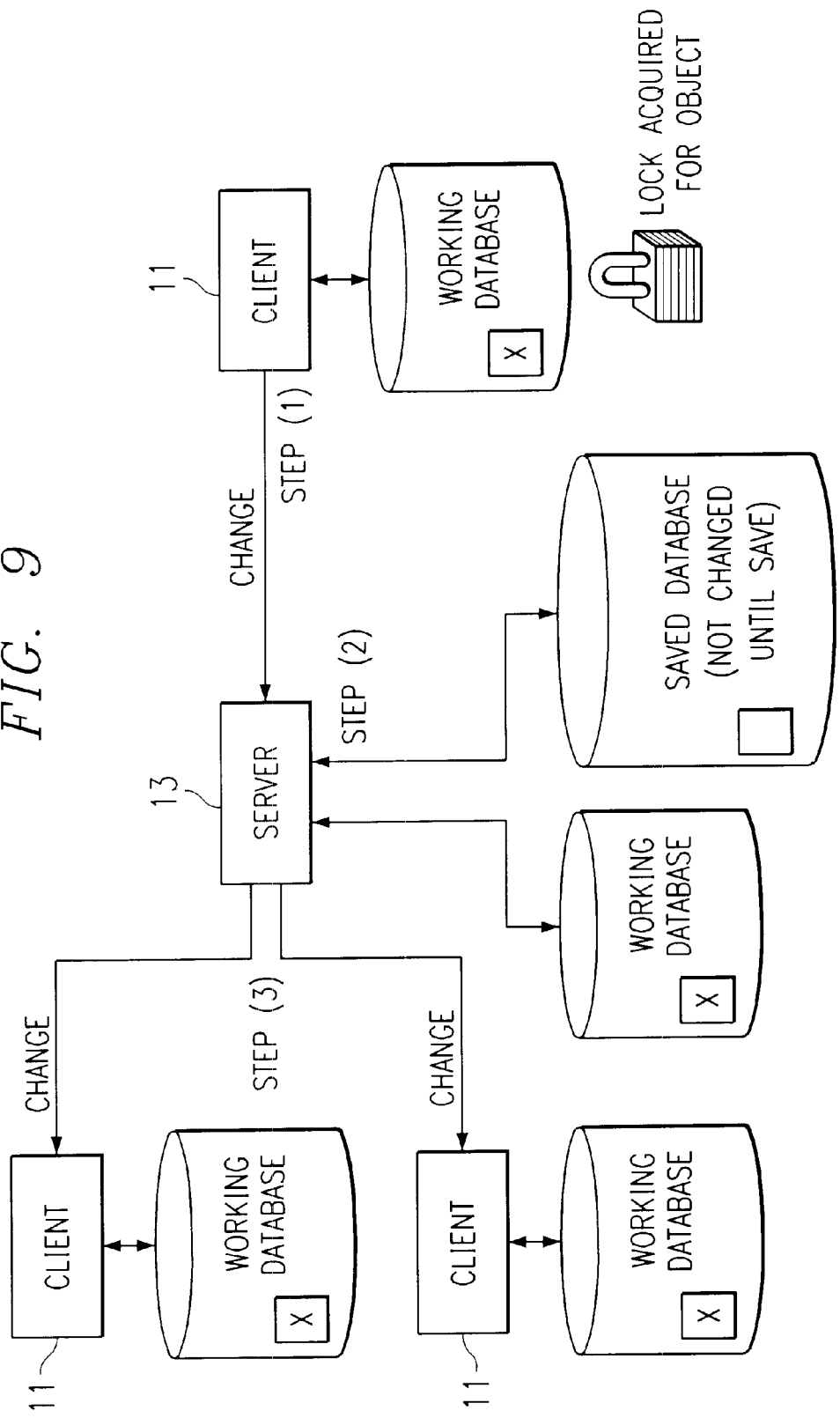

DYNAMIC METHOD FOR CONNECTING A CLIENT TO A SERVER APPLICATION

RELATED APPLICATION

This application claims the benefit of U.S. Provisional Patent Application Ser. No. 60/023,189, "Dynamic Method for Connecting a Client to a Server Application," filed Aug. 5, 1996.

TECHNICAL FIELD OF THE INVENTION

This invention relates to network systems, and more particularly to a method for connecting clients to a server.

BACKGROUND OF THE INVENTION

System developers have struggled to keep pace with the quantum leaps in a computer/hardware arena. Faced with growing application backlogs and skyrocketing maintenance costs, the system development community has sought productivity and quality improvements using various Computer Aided Software Engineering (CASE) tools such as the Information Engineering Facility (IEF) and Composer products of Texas Instruments Incorporated. The subject of Information Engineering has been discussed and described in many text books by James Martin, such as "Information Engineering" Book No. 3 Design and Construction, published in 1990 by Prentice-Hall Incorporated (ISBN 0-13-465501-X). Texas Instruments has published sets of IEF books since 1988. Information Engineering provides a comprehensive framework for satisfying the information needs of a business or an organization. The information engineering encompasses all phases of the software life cycle. It includes the techniques for performing strategic information planning, analysis, design and system construction. The range extends from analyzing business objectives to constructing executable programs in a target environment. There are generally seven stages of Information Engineering. The first is an information strategy planning stage where planners gain a broad view of the information needs of a particular business. From this information, they create a blue print for the future and subdivide the blue print into smaller segments. The second stage is the business area analysis, where the analysts examine a particular segment of the business called a business area and during that stage, they develop a detailed conceptual model of a business area based on the information needs. In the third stage, often referred to as the Business System Design, the designers detail business system with a particular business area. They consider how the user will interact with the business system without concerning themselves with a target computing environment. During the fourth stage, called the technical design stage, the designers tailor the results of the business systems design to the target computing environment, wherein they consider the hardware environment operating system teleprocessing monitor and the database management system. In the fifth stage called the construction stage, the developers generate all executable components of the system. These include the programs, databases, job control statements, screen formats and transaction definitions. These pieces enable the application to run on a selected target environment. In the sixth stage, called the transition stage, the developers install the newly constructed application system in the production environment. In the seventh stage, called the production stage, the business realizes the full benefit of the application system wherein the execution satisfies the specific business needs identified during the information strategy planning.

Texas Instruments began automating information engineering methodology for its own use in 1983, based on the techniques first devised by James Martin Associates. From this genesis, the Information Engineering Facility and Composer products came into being as TI quickly realized the potential impact and usefulness in the overall market place. The result of this effort is a fully integrated set of software tools and automated programs that simplify application development to improve system quality and enhance productivity. FIG. 1 illustrates the primary components of the Information Engineering Facility (IEF). Key elements of the IEF implementation include sophisticated diagraming model under development. These diagrams actively contribute to pseudo code, target code and data base code. The diagrams automatically interconnect within the business model where a change to one causes change in another. There is automatic transformation of results from one stage to another, such as, for example, from a Business Area Analysis entity types and processes automatically result in design-level records and procedures. Similarly, design level records and procedures automatically transform into databases and application programs during the construction phase. There are built in rules ensure consistency and completeness within each stage across the stages. The IEF enforces synchronization so that early stage diagrams remain current and consistent with later diagrams throughout the software development life cycle. The other key elements are automatic consistency checking and automatic high level language and database generation and project coordination. A central repository of business models resides on the mainframe. The information engineering relies heavily on a standardize use of diagrams to convey conceptual ideals. Symbols such as color boxes and interconnecting lines represent data activities and their interaction of various levels of abstraction. As developers progress through the stages, associated diagrams reveal increasing levels of detail. For example, during the early stages of information engineering, block diagrams represent conceptual data objects called entity types and conceptual activities called functions and processes. During later stages, data oriented diagrams depict the physical layouts of records while activity-oriented diagrams show detailed and procedure steps. The information engineering is a visual approach to development, wherein the graphics help developers visualize their ideas on many levels.

At the foundation of information engineering is divide and conquer where developers address successively smaller portions of the business model as level of detail increases, thus reducing each tasks to a manageable size. For example, one Information Strategy Planning project may produce ten Business Area Analysis projects which may result in 100 Business System Design projects. Each stage of information engineering carries its own set of tasks and deliverables. The task list includes all milestones and check points that serve as a basis for projects scheduling and resource allocation. Each project requires a project sponsor; a senior executive with overall authority and responsibility project. The project requires project team members that include project manager and individual contributors with appropriate business skills. The members of the initial project team must gather information to determine the mission, objectives, goals and critical success factors of the enterprise. In addition to these facts, they must have plenty of expertise to develop an Information Strategy Plan in a high level business model.

Client/server applications are maturing. The number of users supported by the average application will double in the next year. Companies are implementing more and more real applications and are demanding scalability in their application development tools. It is desirable to provide a client/ server type, IEF type CASE tool where the development projects are always coordinated between the developers with real time model sharing, so changes to the model are reflected immediately to all of the work stations.

SUMMARY OF THE INVENTION

In accordance with one embodiment of the present invention, clients are connected to a server by providing the server with what user-configured port number to use to accept a client connection on when starting up the server. The server at start-up determines the machines I.P. address. Both the I.P. address and user configured port number are stored in a common access file giving subsequent client workstations a unique address to connect to.

These and other features of the invention that will be apparent to those skilled in the art from the following detailed description of the invention, taken together with the accompanying drawings.

DESCRIPTION OF THE DRAWINGS

FIG. 9 illustrates data synchronization; and

DETAILED DESCRIPTION OF ONE PREFERRED EMBODIMENT OF THE PRESENT INVENTION

Figure 2:
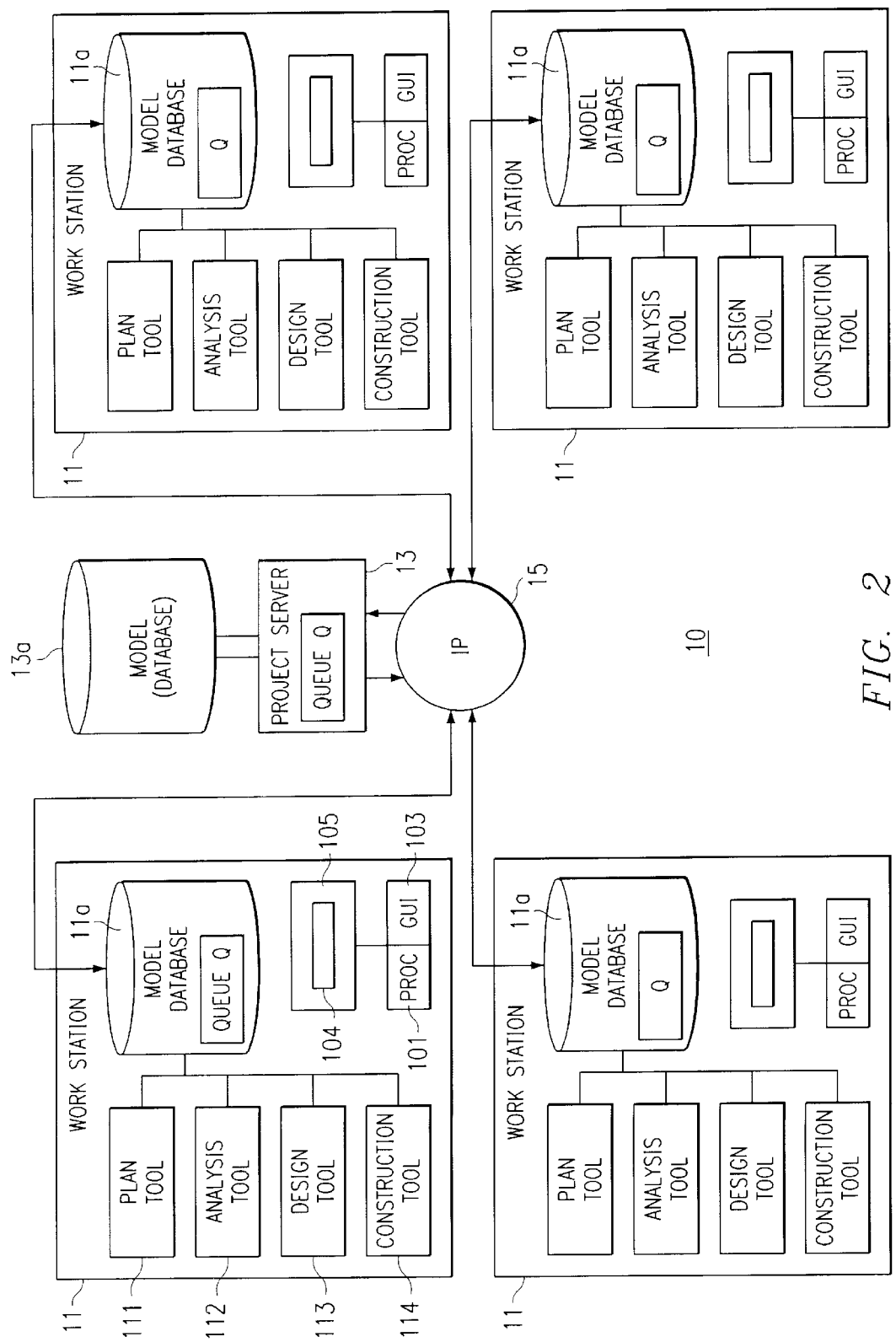
FIG. 2 is a block diagram of the Model Sharing System according to one embodiment of the present invention.

Referring to FIG. 2, a project sharing system 10 according to one preferred embodiment of the present invention includes client workstations 11 with project sharing enabled and a project server 13. A project client workstation 11 (sometimes referred to as client referring to the software on the workstation machine) knows how to coordinate with other project clients workstations through the use of the project server 13. The project server 13 is a separate program that coordinates project clients at client workstations 11. It offers no user interface, and is only useful to project client at client workstations 11. The server 13 is connected to the workstations 11 by a communications link 15 including a hardware connection link like a LAN and controls such as TCP/IP.

In accordance with one embodiment of the present invention, the server 13 has its own storage database with a database engine and in operation stores a master copy of a model generated at one or more client workstations. Each client workstation 11 has its own processor 101, graphical user interface (GUI) 103, a monitor 104, a queue Q, a keyboard, and/or mouse 105 for input, storage database with engine 11a (working storage herein) and the ability to produce and modify a model stored in database 11a and generate code. In this particular embodiment for a CASE tool each workstation includes an IEF or Composer type planning toolset 111, and analysis toolset 112, a design toolset 113, and construction toolset 114. The construction toolset includes a code generator. The server database 13a stores the master copy of the model generated at the client workstations 11 and the workstations store a working copy. It is determined at the client workstations 11 that the new code generated works as intended before sending to the server 13 and is incorporated in the master copy.

Each database in the system 10 is comprises of several individual files. The user must first establish a connection to a network file system to access a saved database to be detailed later. Project sharing begins when a user at client workstation 11 opens a database or creates a new database in shared mode. Other users wishing to share the same database open the same copy of the database in shared mode.

Client workstation 11 can only communicate to a server 13, which in turn can only communicate to client workstations 11. No direct messaging occurs between client workstations 11 over system 10. Messages will always be routed through the server 13. Servers do not interact with other servers as each controls a different project database. Further, a client workstation 11 using system 10 can only connect to one server 13 at any one time, where a server 13 can connect to many client workstations 11, allowing the server 13 to broadcast to all client workstations. This type of communications configuration, sometimes known as a hub (or star), is pictured in FIG. 2. The client and the server software are distinct pieces of software and may be executed on the same or different machines. There is no dependence on any specific piece of hardware. When the client software is on a machine it is termed herein a client workstation and when a server software is on a machine it is a server. The server 13 will continue running until all client workstations 11 have disconnected from it.

Section 1: Establishing a connection

Transmission Control Protocol/Internet Protocol (TCP/IP) is a well known standard where TCP controls the data transfer and IP provides the routing through hardware connections 15 between client workstations 11 and servers 13. The invention relies on the Berkeley compatible TCP/IP functions to implement with the hardware the core communications for connecting client workstations 11 to the server 13. Essentially, this protocol requires programs to have a 32-bit IP address and a 16-bit port number in order to provide connectivity. IP addresses resolve machine locations, and port numbers are used to resolve client and server process locations on the client workstation. At any one instance, the combined IP address and port number may be used to uniquely identify any client workstation 11 or server application.

Figure 1:
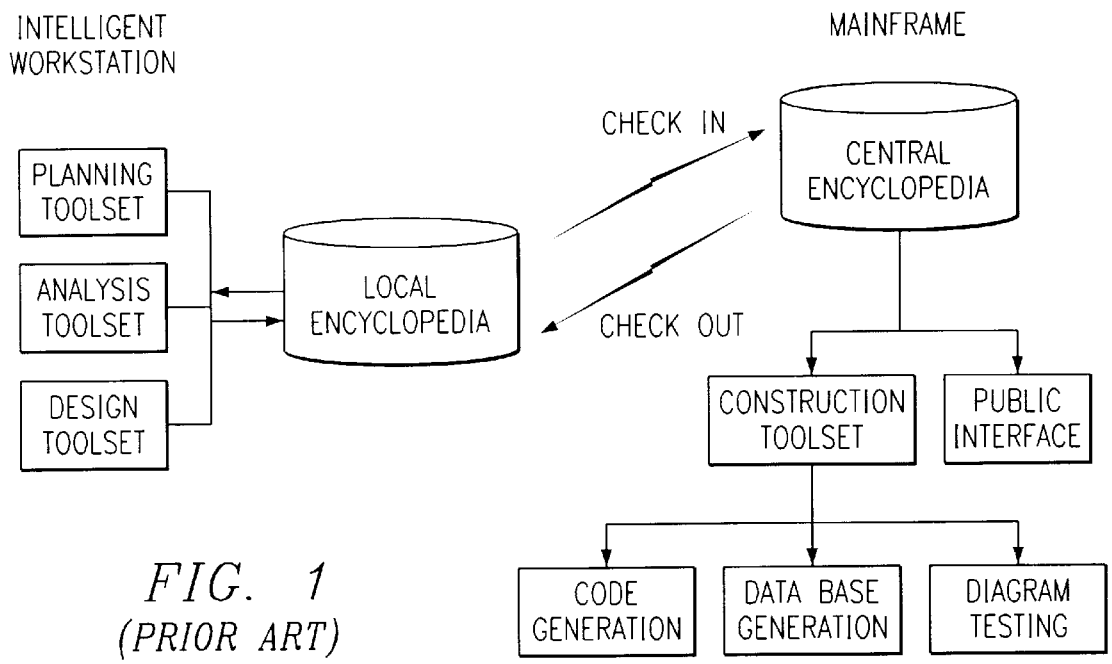
FIG. 1 is a block diagram of prior art IEF system.
Figure 3:
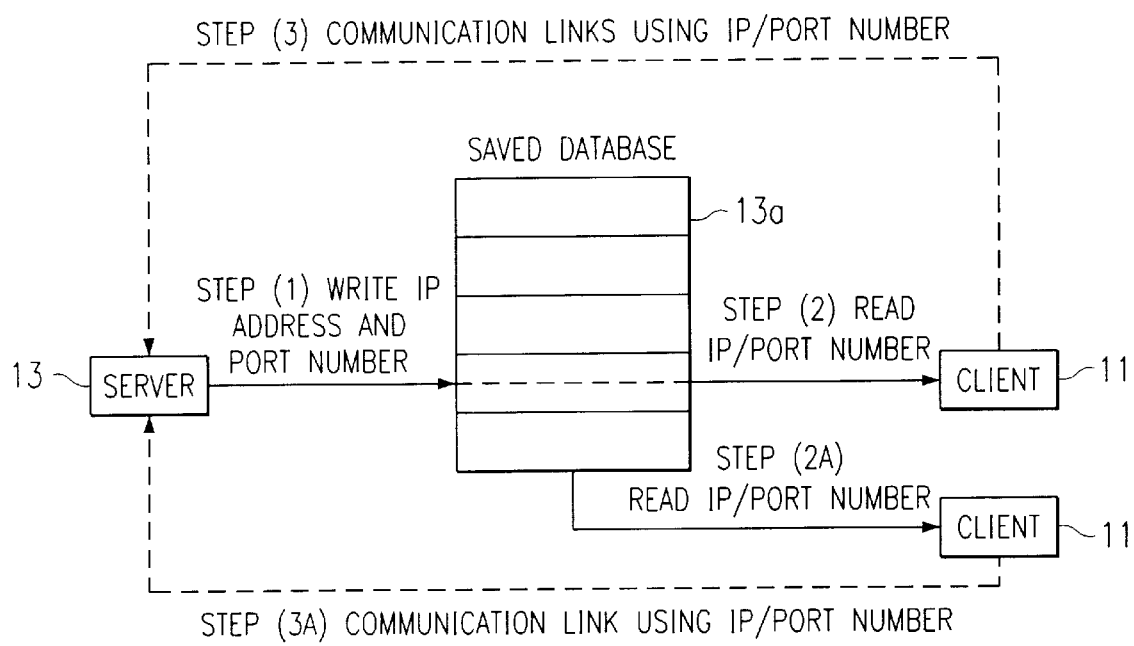
FIG. 3 illustrates connecting client workstations to server.

The client workstations 11 and server 13 have three stages of operation—startup, event handling, and shutdown. The server 13, on startup, will query the host machine's IP address and write both the IP address and the user supplied port number into the database's access log file. The client workstations 11 on startup, will read the server specific IP address and port number from the same file as illustrated in FIG. 3. This is necessary for two reasons: First, there is only one server per database. Any attempt to start a subsequent server for the same project would fail, because the file is being accessed by the initial server. Second, this allows the client workstations to find the server, since the user can start the server on any workstation machine.

Any need for the users to preconfigure (or reconfigure) the client IP services is eliminated. The benefit of this paragraph is visible to the user for two reasons. The first is that the client 11 and the server 13 can be executed on any machine without the need for special installation or configuration. The second is that when the server 13 or hardware fails and a server 13 is started somewhere else, the clients 11 can connect back to the server without any changes to the IP configuration. The time required for this restart and connection to the server 13 is limited only by the time it takes the user to reopen the project database files.

A typical TCP/IP configuration is known to those skilled in the art. Once could use, for example, Microsoft's Windows WinSock TCP/IP for which there is known textbooks. With this approach, the TCP/IP configuration is hidden from the user.

Section 2: TICP/IP Two-way Connectivity

Within TCP/IP, two different classes of sockets exist— stream and datagram. Stream sockets provide two-way communications and require a connected session. They provide reliability for data transfer and guarantee integrity of the data. Datagram sockets, however, provide only one-way communications. They neither ensure reliability in the data transfer nor guarantee integrity of data and do not require a connected session. For these reasons, the invention requires stream sockets.

Once a stream socket is setup, event processing can begin. Events include a client workstation 11 connection to the server 13, a client workstation 11 disconnect from the server 13, the server disconnect from a workstation client, and incoming messages to workstation clients 11 or the server 13. Standard techniques are used for handling connect and disconnect events, but a special technique described below is used for handling messages.

Section 3: Establishing the Priority Queue

TCP/IP stream sockets receive messages in the order they are sent. They do not inherently provide a mechanism for controlling the order in which messages are processed. Not all messages are weighted equally in importance or in the amount of processing required.

In addition, the server 13 will be managing many sockets (one per client). As the activity to the server increases, the rate of event handling inevitably lags behind. When this happens, some events may become invalid prior to processing. The invention uses a queuing mechanism to provide what TCP/IP doesn't, a priority messaging system where high priority messages can supersede low priority messages.

Priority messages handling scheme will ensure two features. One is, no client workstation 11 will starve from lack of server 13 attention. The second is, messages received by the client workstations 11 and server 13 at any instance will be handled from highest to lowest priority. Starvation is avoided using a rotation scheme. All awaiting messages are moved to a queue before they are processed. Both the server 13 and the client workstations 11 have a queue labeled Q in FIG. 2. This buffering of incoming messages provide the basis of priority messaging. Received messages are insertion sorted into the queue by priority. For the server 13, after all waiting client messages have been read the messages in the queue Q can be selectively handled. Any messages arriving while messages are being processed are not moved to the queue until it has been emptied at which time the next rotation occurs.

Figure 4A:
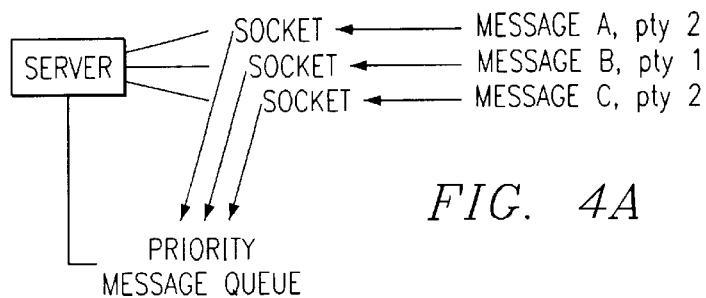
FIG. 4 illustrates server priority messaging and FIG. 4B illustrates client workstation priority messaging.
Figure 4B:
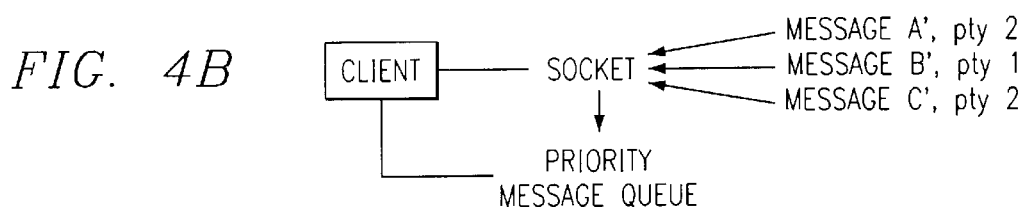

In FIG. 4A, assume the messages reach the server 13 in the order A, B, and C with priorities 2, 1, and 2 respectively. Message B with priority 1 will get handled first. A and C will then follow in that order since equal priority messages handled by rotation order. Note that even if message C were to reach the server 13 before message A, message A would still be handled first, because it has precedence in the rotation. However, if message D, priority 1 shows up while the handling for messages A, B, and C have already started, it will have to wait until the next rotation. In FIG. 4B, the client workstation 11 while processing a message may receive more messages which will be placed in its queue Q by the priority value on the message.

Section 4: Synchronous and Asynchronous messages

Figure 5A:
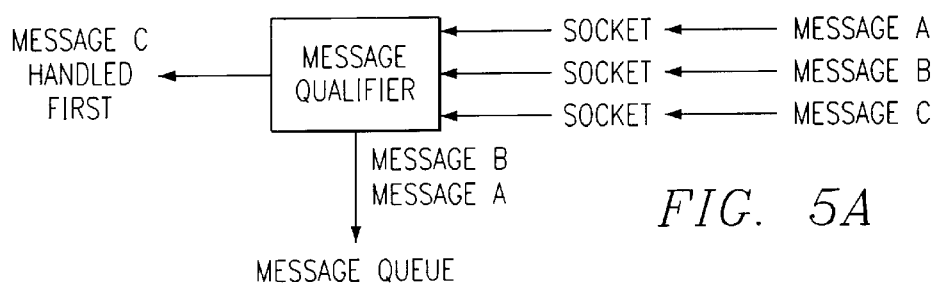
FIG. 5A illustrates server synchronous message handling and FIG. 5B illustrates client synchronous message handling.
Figure 5B:
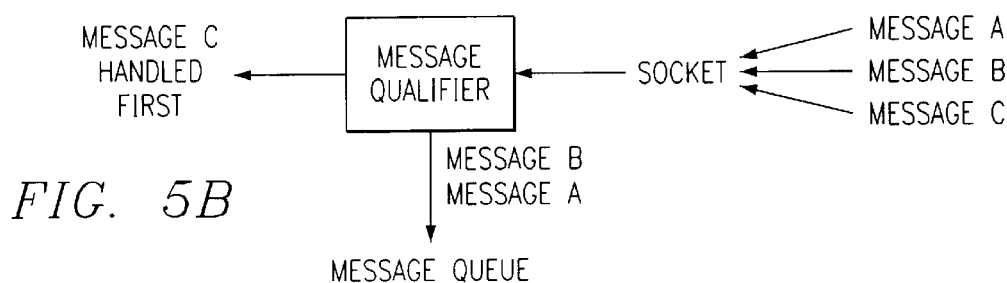

Some messages are asynchronous to the client workstation 11 in that they may be received at any time. Such messages include database changes, client notifications and exception information. In these cases the client workstations 11 and the server 13 will continue processing other received messages. In reference to FIG. 5A and 5B, other messages, which are synchronous, or appearing in response to a particular request, may include session connect, disconnect and object locking. While a client workstation 11 is waiting for the response to one of these messages, the incoming messages are qualified by message class, message id, and optionally message number. The response to the request is processed and the client workstation 11 continues execution normally. All other messages are placed on the queue Q in priority order and will be processed once the client workstation 11 has returned to the queue processing loop.

Only the server 14 to client workstation 11 confirmation exception message is considered synchronous by the server 13. All other messages sent to the server 13 are asynchronous.

For the client workstations 11 and the server 13, only one message at a time will be processed. There is no preemptive message which will cause an interruption in processing.

Section 5: Database Replication

Figure 6A:
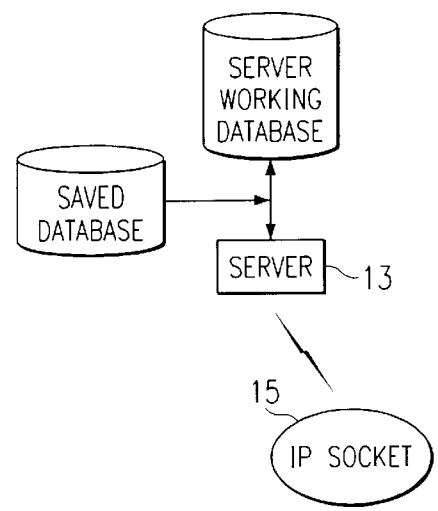
FIGS. 6A–6C illustrate database replication.
Figure 6B:
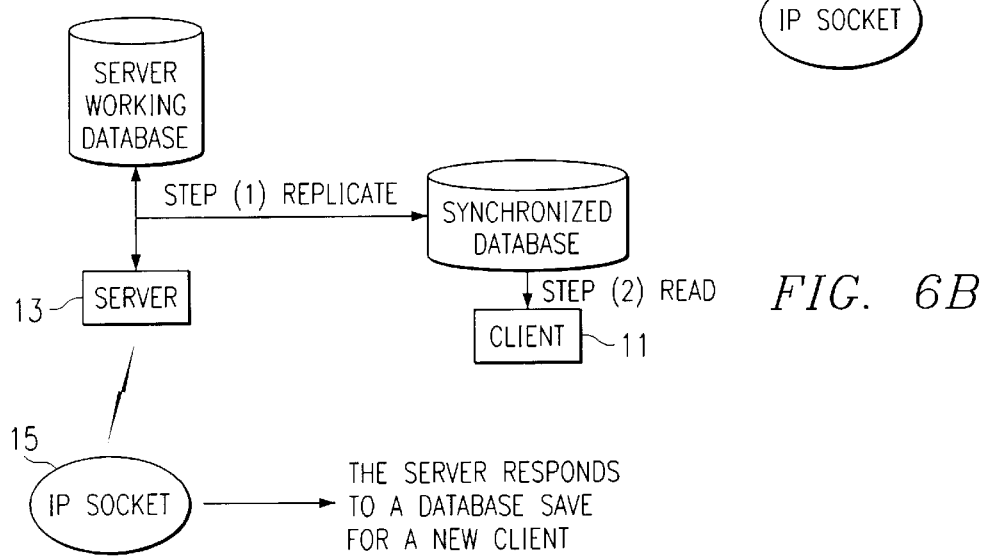

As mentioned earlier, the user must first connect to a network file system to access the database. All database access and updates done by the client workstations 11 and the server 13 is through the database engine 11A and 13A in FIG. 2. The database engine on top of its database is a common piece of software used by all client workstations 11 and the server 13. Referring to FIGS. 6A and 6B, after initializing the TCP/IP communications, the server 13 reads the database files, known as the saved database (part of database 13a in FIG. 2), and makes a copy local to the machine executing the server. This is known as the server working database (also part of database 13a in FIG. 2). See FIG. 6A. The database engine executed by the server 13 references the server working database 13a exclusively.

When a client workstation 11 requests a connection to the server 13, it waits while the server 13 writes its working database to the network file system. This copy of the project database is known as the synchronized database (part of server database 13a in FIG. 2). See FIG. 6B. The synchronized database is only written if it does not yet exist or is older than the current server working database. The server 13 then responds to the client workstation 11 that it may read the database and complete the connection and initialization. At this time, the server 13 will announce the new client workstation 11 to the other connected client workstations 11, as well as notify the new client workstation 11 of the previously connected client workstations 11. This is done for each client workstation 11 connection requested to endure that the connecting client workstation 11 has the current state of the working database. The client workstation 11, upon reading the synchronized database, creates a copy local to the machine executing the client. See FIG. 6A. This is known as the client working database 11a. The database engine executed by the client workstation 11 references the client working database exclusively.

Figure 6C:
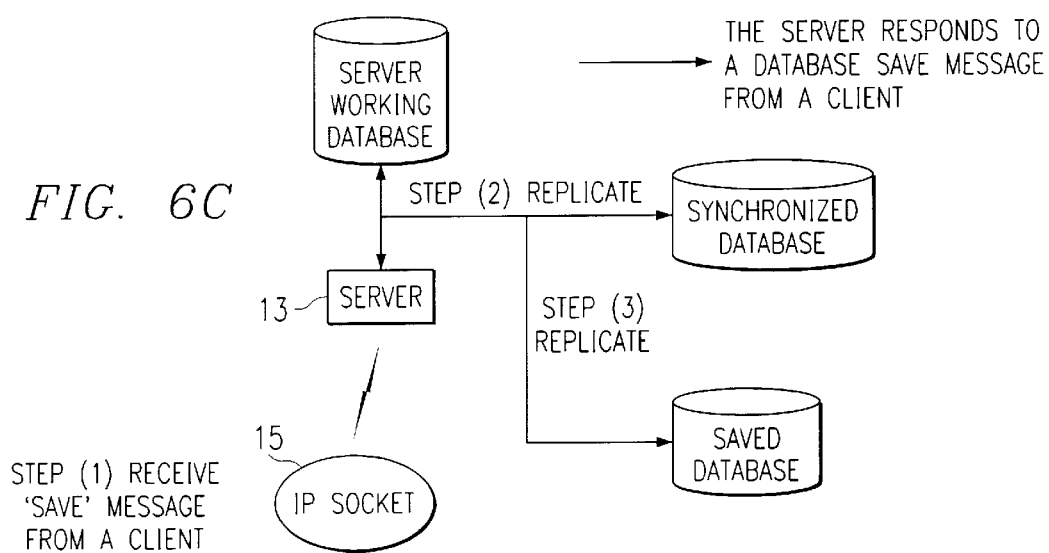

As the server 13 is responsible for creating the synchronized database (part of 13a), it also updates the saved database (part of database 13a) upon receiving the appropriate message from any of the client workstations 11. See FIG. 6C. These two operations are the unique responsibility of the server 13. When database changes occur, they must be applied to all client workstation 11 and server 13 working copies in such a way they do not conflict with each other or any of the operations mentioned above. All of this activity necessitates cooperation between the clients and the server. To synchronize the activities, the server 13 coordinates database object locking requests by the clients.

Section 6: Object Locking

Figure 7A:
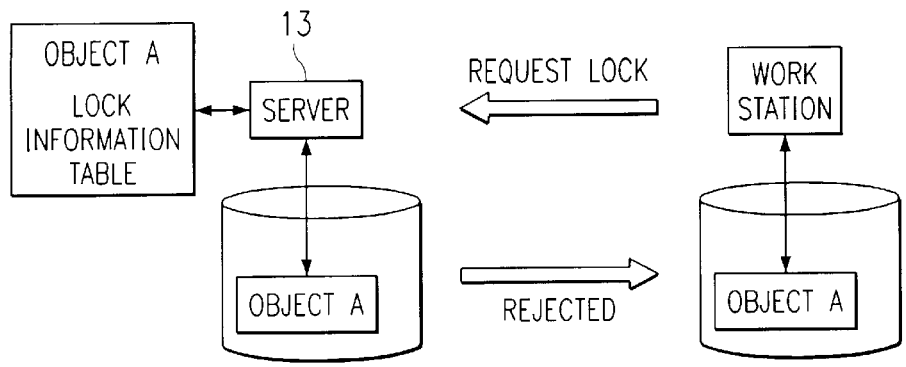
FIGS. 7A and 7B illustrate object-level locking.
Figure 7B:
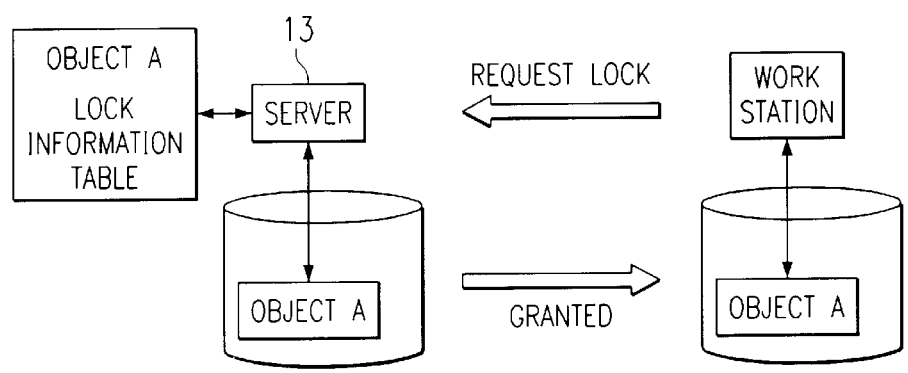
Figure 8:
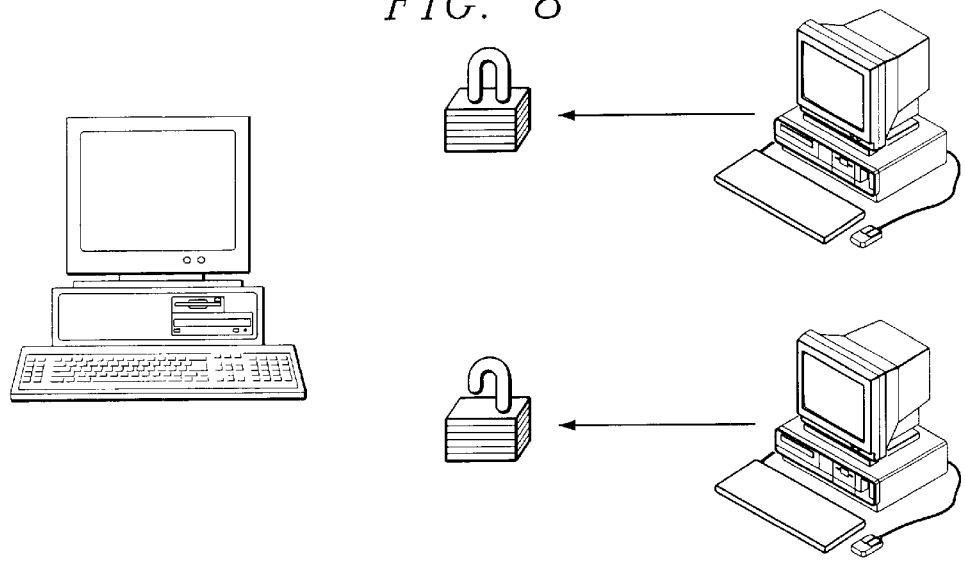
FIG. 8 illustrates locking sequence.

Referring to FIGS. 7A, 7B, and 8, object locking is the mechanism by which the client workstations 11 coordinate mutually exclusive activities through the server 13. These include client workstation and server working database updates, connection of new client workstations and server working database updates, connection of new client workstations and updating the saved database. This is termed 'object locking' because objects in the database are used as the unique key values for the locks. As all client workstations 11 have a replication of the database, these values are guaranteed to be consistent. Consequently, an object lock by one client workstation 11 can be validated against the object locks held by the other client workstations 11.

The client workstations 11 must agree on the database object which is used as the key to control updates to the database 13a. This is known as the 'update' key. Prior to making any changes to its working database content, the client workstation 11 sends a message to the server 13 and requests a lock on the 'update' key. The server 13 will check for locks held by the other clients for a match with the 'update' key in a lock information table. If another client workstation 11 has the key locked, a response message is sent back rejecting the client's request as illustrated in FIG. 7A. If no other client workstation has the key locked, a message is sent to the client workstation 11 confirming the lock and the server 13 adds an entry to its lock information table as illustrated in FIG. 7B.

If the client workstation 11 receives a reject for the 'update' key lock, no changes to the its working database 11a are made. Should database changes be attempted in absence of the lock, the project content will be corrupted. If the client workstation 11 receives a confirmation of the lock request, the database changes can be made knowing that none of the other client workstations 11 are attempting changes. When the changes are complete, the client workstation 11 sends a message to the server 13 to release the 'update' key. The server 13 removes the entry from its' lock information table. Because the stream socket in TCP/IP guarantees delivery of the message, it is not necessary for the server 13 to send a confirmation on the release request. Should the client workstation 11 not have a lock and send a release message to the server 13, the message will be ignored. The length of time any one client workstation holds the lock on the 'update' key will cause all other client workstations to disallow changes to the database, prevents any new client workstations from connecting into the server and prevents any attempt to request the server 13 to update the saved database 13a.

At times, client workstations 11 can perform excessive processing that require exclusive access to the database 13a for long periods of time. In these situations, a client workstation will send a client busy message to the server 13 to inform other client workstations 11 of the activity. When the client workstation 11 activity completes, another message is likewise sent informing the server 13 and other client workstations 11. The server 13 may also initiate a similar scenario when a new client workstation 11 connects or a client workstation 11 requests an update of the saved database. These messages are used in addition to the object locking messages for more detailed dissemination of information to client workstations. Without these messages, the client workstations 11 only know that a lock has been placed on the 'update' key.

Section 7: Data Synchronization

While a client workstation 11 has a lock on the 'update' key, it may make any changes to the database. See FIG. 9. These changes are made immediately to the client workstation 11 working database 11a and buffered for future transmission following the ordered steps 1, 2 and 3 illustrated. When the client workstation 11 completes the database changes, all buffered messages, if any, are sent to the server 13. Then a message is always sent to release the object lock for the 'update' key. Since these changes have already been made to the client working database 11a, they are considered valid and the server 13 will not send any confirmation. The server 13 broadcasts the message to all other client workstations 11 who also apply the change. Then the server 13 processes the message locally, applying the change to the server working database in database 13a and is saved in the saved database of 13a when saved. This process is referred to as synchronizing the databases.

When the client workstations 11 attempts to send a database change message without prior locking of the 'update' key, the server 13 will reject the change and send an error message to the client. The client will send a disconnect message to the server 13 as the client working database 11a is no longer synchronized with the server working database 13a.

Section 8: Disconnects

Figure 10A:
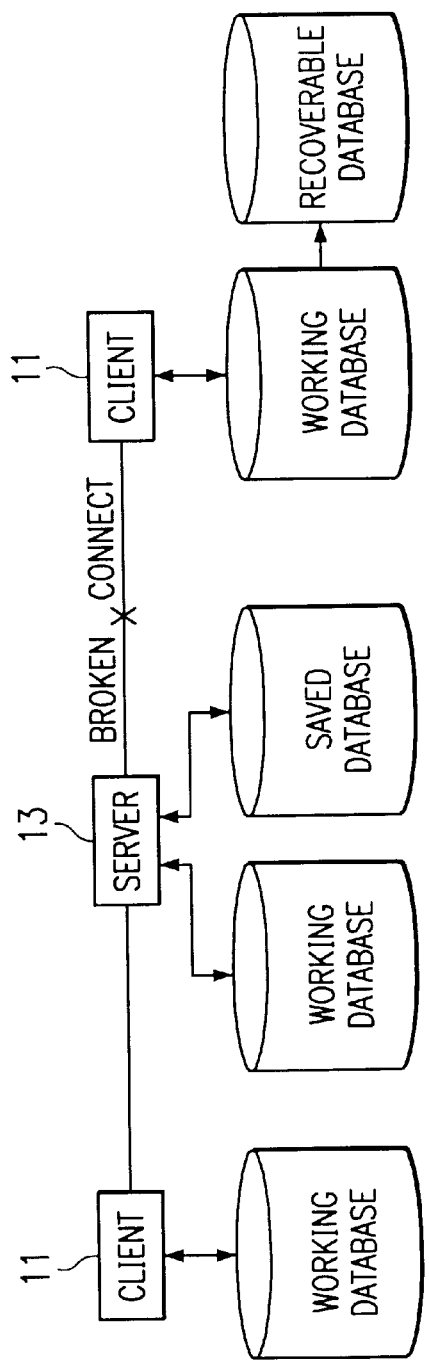
FIG. 10A illustrates abnormal disconnects where at least one remaining client workstation is connected to the server and FIG. 10B illustrates abnormal disconnects for the last remaining client workstation.
Figure 10B:
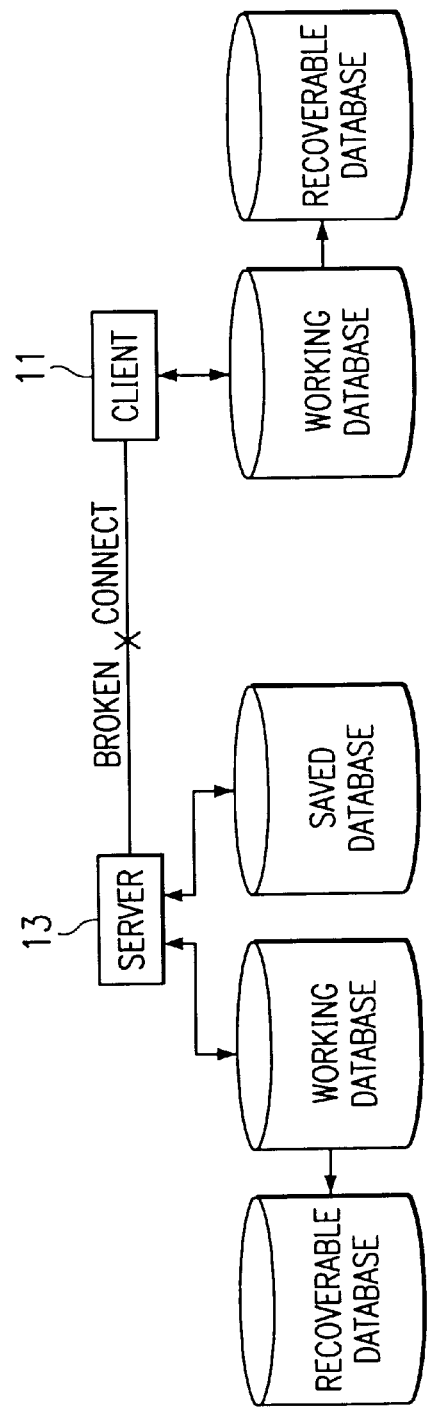

Referring to FIGS. 10A and 10B, when a client workstation 11 sends a discomnect message to the server 13, the client terminates the TCP/IP socket. When the server 113 receives the disconnect message, it notes the client workstation 11 is performing a controlled disconnect. The server 13 then receives the terminate socket event from TCP/IP and removes all appropriate entries from the message queue, lock information table and client information table. The server 13 then broadcasts a disconnect of the client to all remaining client workstations 11.

Should a client workstation 11 abnormally terminate, TCP/IP will still notify the server 13 via an event, however the client workstation 11 will not be able to send the disconnect message prior to the event. Consequently, the server 13 notes the client workstation 11 abnormally disconnected for future reference. The server 13 then continues processing as in a controlled disconnect. When the server 13 terminates, if the last client workstation 11 abnormally disconnected, the server 13 will write a copy of the server 13 working database known as a recovery database. This is done for the users' convenience to ensure the database content is not lost.

Should the server 13 abnormally terminate, TCP/IP will notify the client workstations 11 that they have been disconnected from the server. Since each client workstations 11 has a local working copy of the database, their work will not be lost. Each client's working database will be saved locally at 11a, and the client workstation 11 will stop processing updates to its working database 11a.

Section 9: Message formats and contents tables

All communication between the clients and server is done via a message event through the TCP/IP stream sockets. A common format is used for all messages. Each message begins with a 16-byte header (as shown below in Table 1) followed by a variable length data portion.

TABLE 1

Message Headers

| Byte Positions | Field | Description |
|---|---|---|
| 0–3 | Message length (4 bytes) | The total number of bytes contained in the message, including the 16-byte header data. |
| 4 | Header format (1 byte) | A number identifying the header format. |
| 5–6 | Message number (2 bytes) | A client assigned message number. |
| 7–10 | Codepage (4 bytes) | The codepage for the message |
| 11–12 | From client id (2 bytes) | The server-assigned client id for the originator of each message. 0xFFFF is reserved as the id of the server. |
| 13 | Priority (1 byte) | The message priority. |
| 14 | Message class (1 byte) | The message class. |
| 15 | Message id (1 byte) | The message id uniquely identifying each message within the message class. |

The following tables 2–16 detail content of messages sent between a client and the server.

TABLE 2

Session Connect Request from Client to Server

| Byte Positions | Field | Description |
|---|---|---|
| 0–3 | Message length (4 bytes) | ≧22 |
| 4 | Header format (1 byte) | standard |
| 5–6 | Message number (2 bytes) | A client assigned message number. |
| 7–10 | Codepage (4 bytes) | The codepage for the message |
| 11–12 | From client id (2 bytes) | N/A |
| 13 | Priority (1 byte) | normal |
| 14 | Message class (1 byte) | CONNECT |
| 15 | Message id (1 byte) | REQUEST_SESSION |
| 16–19 | Client version (4 bytes) | supplied by client |
| 20–n | User name (variable) | The name of the user using the workstation software. |

TABLE 3

Session Reply from Server to Client for Connect

| Byte Positions | Field | Description |
|---|---|---|
| 0–3 | Message length (4 bytes) | 19 |
| 4 | Header format (1 byte) | standard |
| 5–6 | Message number (2 bytes) | A client assigned message number. |
| 7–10 | Codepage (4 bytes) | The codepage for the message |
| 11–12 | From client id (2 bytes) | 0xFFFF |

TABLE 3-continued

Session Reply from Server to Client for Connect

| Byte Positions | Field | Description |
|---|---|---|
| 13 | Priority (1 byte) | normal |
| 14 | Message class (1 byte) | CONNECT |
| 15 | Message id (1 byte) | REPLY_SESSION |
| 16 | Sessions reply (1 byte) | The enumerated reply indicating the result of the connect request. |
| 17–18 | Client id (2 bytes) | A server-defined id to uniquely distinguish this client. |

TABLE 4

Project Loaded from Client to Server

| Byte Positions | Field | Description |
|---|---|---|
| 0–3 | Message length (4 bytes) | 19 |
| 4 | Header format (1 byte) | standard |
| 5–6 | Message number (2 bytes) | A client assigned message number. |
| 7–10 | Codepage (4 bytes) | The codepage for the message |
| 11–12 | From client id (2 bytes) | id returned by the REPLY_SESSION message |
| 13 | Priority (1 byte) | urgent |
| 14 | Message class (1 byte) | MISCELLANEOUS |
| 15 | Message id (1 byte) | PROJECT_LOADED |

TABLE 5

End Session Requested from Client to Server

| Byte Positions | Field | Description |
|---|---|---|
| 0–3 | Message length (4 bytes) | 16 |
| 4 | Header format (1 byte) | standard |
| 5–6 | Message number (2 bytes) | A client assigned message number. |
| 7–10 | Codepage (4 bytes) | The codepage for the message |
| 11–12 | From client id (2 bytes) | id returned by the REPLY_SESSION message |
| 13 | Priority (1 byte) | normal |
| 14 | Message class (1 byte) | CONNECT |
| 15 | Message id (1 byte) | REQUEST_ENDSESSION |

TABLE 6

Peers Update from Server to Client

| Byte Positions | Field | Description |
|---|---|---|
| 0–3 | Message length (4 bytes) | ≧21 |
| 4 | Header format (1 byte) | standard |

TABLE 6-continued

Peers Update from Server to Client

| Byte Positions | Field | Description |
| --- | --- | --- |
| 5–6 | Message number (2 bytes) | N/A |
| 7–10 | Codepage (4 bytes) | The codepage for the message |
| 11–12 | From client id (2 bytes) | 0xFFFF |
| 13 | Priority (1 byte) | normal |
| 14 | Message class (1 byte) | MISCELLANEOUS |
| 15 | Message id (1 byte) | PEER_CONNECT |
| 16–17 | Peer list size (2 bytes) | Count of peer information structures in message, ≧1 |
| 18–n | Peer information structure list (variable) | A variable length array of (client id, user name) records for each client currently connected to the server. |

TABLE 7

Save Request from Client to Server

| Byte Positions | Field | Description |
| --- | --- | --- |
| 0–3 | Message length (4 bytes) | 16 |
| 4 | Header format (1 byte) | standard |
| 5–6 | Message number (2 bytes) | A client assigned message number. |
| 7–10 | Codepage (4 bytes) | The codepage for the message |
| 11–12 | From client id (2 bytes) | id returned by the REPLY_SESSION message |
| 13 | Priority (1 byte) | normal |
| 14 | Message class (1 byte) | DATABASE_CHANGE |
| 15 | Message id (1 byte) | SAVE_MODEL |

TABLE 8

Project Change from Client to Server

| Byte Positions | Field | Description |
| --- | --- | --- |
| 0–3 | Message length (4 bytes) | ≧17 |
| 4 | Header format (1 byte) | standard |
| 5–6 | Message number (2 bytes) | A client assigned message number. |
| 7–10 | Codepage (4 bytes) | The codepage for the message |
| 11–12 | From client id (2 bytes) | id returned by the REPLY_SESSION message |
| 13 | Priority (1 byte) | normal |
| 14 | Message class (1 byte) | DATABASE_CHANGE |
| 15 | Message id (1 byte) | TRANSACTION |
| 16–n | Transaction list (variable) | A variable length list of transactions in a format specific to the database engine. |

TABLE 9

Object Lock Request from Client to Server

| Byte Positions | Field | Description |
| --- | --- | --- |
| 0–3 | Message length (4 bytes) | 25 |
| 4 | Header format (1 byte) | standard |
| 5–6 | Message number (2 bytes) | A client assigned message number. |
| 7–10 | Codepage (4 bytes) | The codepage for the message |
| 11–12 | From client id (2 bytes) | id returned by the REPLY_SESSION message |
| 13 | Priority (1 byte) | normal |
| 14 | Message class (1 byte) | LOCK |
| 15 | Message id (1 byte) | REQUEST_OBJECT_LOCK |
| 16–21 | Database object id (6 bytes) | The id of the database object the client wishes to lock. |
| 22–23 | Lock owner id (2 bytes) | Same as From client id field. |
| 24 | Lock level (1 byte) | Access - multiple clients may have the lock on the same object Delete - only one client may have the lock on the object |

TABLE 10

Object Lock Reply from Server to Client

| Byte Positions | Field | Description |
| --- | --- | --- |
| 0–3 | Message length (4 bytes) | 19 |
| 4 | Header format (1 byte) | standard |
| 5–6 | Message number (2 bytes) | A client assigned message number. |
| 7–10 | Codepage (4 bytes) | The codepage for the message |
| 11–12 | From client id (2 bytes) | 0xFFFF |
| 13 | Priority (1 byte) | normal |
| 14 | Message class (1 byte) | LOCK |
| 15 | Message id (1 byte) | REPLY_OBJECT_LOCK |
| 16 | Lock return code (1 byte) | An enumerated reply to the lock request. |
| 17–18 | User id (2 bytes) | The client id of the user that currently holds the lock. |

TABLE 11

Object Lock Release from Client to Server

| Byte Positions | Field | Description |
| --- | --- | --- |
| 0–3 | Message length (4 bytes) | 25 |
| 4 | Header format (1 byte) | standard |
| 5–6 | Message number (2 bytes) | A client assigned message number. |
| 7–10 | Codepage (4 bytes) | The codepage for the message |
| 11–12 | From client id (2 bytes) | id returned by the REPLY_SESSION message |

TABLE 11-continued

Object Lock Release from Client to Server

| Byte Positions | Field | Description |
|---|---|---|
| 13 | Priority (1 byte) | normal |
| 14 | Message class (1 byte) | LOCK |
| 15 | Message id (1 byte) | REQUEST_OBJECT_LOCK |
| 16–21 | Database object id (6 bytes) | The id of the database object the client wishes to release. |
| 22–23 | Lock owner id (2 bytes) | Same as From client id field. |
| 24 | Lock level (1 byte) | N/A |

TABLE 12

Busy Message from Server to Client

| Byte Positions | Field | Description |
|---|---|---|
| 0–3 | Message length (4 bytes) | ≧21 |
| 4 | Header format (1 byte) | standard |
| 5–6 | Message number (2 bytes) | N/A |
| 7–10 | Codepage (4 bytes) | The codepage for the message |
| 11–12 | From client id (2 bytes) | 0xFFFF |
| 13 | Priority (1 byte) | normal |
| 14 | Message class (1 byte) | LOCK |
| 15 | Message id (1 byte) | SERVER_BUSY |
| 16–17 | From_id (2 bytes) | Client id that caused the server to enter a long-running process during which no project updates may occur. |
| 18–19 | Msg_type (2 bytes) | Signifies the begin or end of the process. |
| 20–n | Msg (variable) | A description of the long running process which the client may display to the user. |

TABLE 13

Busy Message from Client to Server

| Byte Positions | Field | Description |
|---|---|---|
| 0–3 | Message length (4 bytes) | ≧19 |
| 4 | Header format (1 byte) | standard |
| 5–6 | Message number (2 bytes) | A client assigned message number. |
| 7–10 | Codepage (4 bytes) | The codepage for the message |
| 11–12 | From client id (2 bytes) | id returned by the REPLY_SESSION message |
| 13 | Priority (1 byte) | normal |
| 14 | Message class (1 byte) | LOCK |
| 15 | Message id (1 byte) | CLIENT_BUSY |
| 16–17 | Msg_type (2 bytes) | Signifies the begin or end of the process |

TABLE 13-continued

Busy Message from Client to Server

| Byte Positions | Field | Description |
|---|---|---|
| 18–n | Msg (variable) | A description of the long running process for the server to communicate to other clients via the SERVER_BUSY message.. |

TABLE 14

Exception Notification from Server to Client

| Byte Positions | Field | Description |
|---|---|---|
| 0–3 | Message length (4 bytes) | ≧21 |
| 4 | Header format (1 byte) | standard |
| 5–6 | Message number (2 bytes) | N/A |
| 7–10 | Codepage (4 bytes) | The codepage for the message |
| 11–12 | From client id (2 bytes) | 0xFFFF |
| 13 | Priority (1 byte) | urgent |
| 14 | Message class (1 byte) | DATABASE_CHANGE |
| 15 | Message id (1 byte) | EXCEPTION_NOTIFY |
| 16–17 | Exception type (2 bytes) | Confirm - Server waits for a response from the client<br>Note - Informational message<br>Warning - Minor error, but the server will continue processing<br>Error - Significant error, but the server will continue processing<br>Fatal - Catastrophic error, and the server will abort |
| 18–19 | Help id (2 bytes) | Associated help resource id. |
| 20–n | Text (variable) | Exception message string which the client will display to the user. |

TABLE 15

Exception Notification Reply from Client to Server

| Byte Positions | Field | Description |
|---|---|---|
| 0–3 | Message length (4 bytes) | 18 |
| 4 | Header format (1 byte) | standard |
| 5–6 | Message number (2 bytes) | A client assigned message number. |
| 7–10 | Codepage (4 bytes) | The codepage for the message |
| 11–12 | From client id (2 bytes) | id returned by the REPLY_SESSION message |
| 13 | Priority (1 byte) | urgent |
| 14 | Message class (1 byte) | DATABASE_CHANGE |
| 15 | Message id (1 byte) | EXCEPTION_REPLY |
| 16–17 | Exception reply (2 bytes) | Reply for the server Confirm exception. |

TABLE 16

Out of Sync from Server to Client

| Byte Positions | Field | Description |
|---|---|---|
| 0–3 | Message length (4 bytes) | 16 |
| 4 | Header format (1 byte) | standard |
| 5–6 | Message number (2 bytes) | N/A |
| 7–10 | Codepage (4 bytes) | The codepage for the message |
| 11–12 | From client id (2 bytes) | 0xFFFF |
| 13 | Priority (1 byte) | urgent |
| 14 | Message class (1 byte) | MISCELLANEOUS |
| 15 | Message id (1 byte) | OUT_OF_SYNC |

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of connecting a client to a server comprising the steps of:
   providing the server with a user-configured port number to use to accept client connections when starting up the server;
   determining at the server on start-up an IP address of the server;
   storing the IP address and the user-configured port number in a common access file accessible by the server and the client;
   establishing a client rotation;
   receiving a message from the client;
   reading priority level from the message;
   determining a current client rotation position for the client in response to the message; and
   inserting the message into a message queue in response to the priority level and the current client rotation position of the client.

2. The method of claim 1, further comprising the step of creating by the server a stream socket for communication with the client.

3. The method of claim 1, further comprising the step of reading by the client the IP address and the user-configured port number from the common access file.

4. The method of claim 3, further comprising the step of sending a session connect request message from the client to the server, the session connect request message including the IP address and the user-configured port number.

5. The method of claim 4, further comprising the step of sending a session reply message from the server to the client in response to the session connect request message.

6. The method of claim 4, further comprising the steps of:
   establishing a message queue at the server;
   establishing a client rotation order at the server for processing of messages including the client in the client rotation order by the server in response to the session connect request message.

7. A computer network, comprising:
   a server;
   a client in communication with the server;
   a common access file accessible by the server and the client, the common access file having address information for the server;
   the server being operable to create the common access file;
   the client being operable to read the address information from the common access file when the client is started up; and
   a message processing system operable to establish a client rotation, receive a message from the client, read a priority level from the message, determine a current client rotation position for the client in response to the message, and insert the message into a message queue in response to the priority level and the current client rotation position of the client.

8. The computer network of claim 7, wherein the common access file includes an IP address and a user-configured port number for communication with the server.

9. A method of connecting clients to a server to share a database, comprising:
   receiving a request to open a database in shared mode from a first client;
   starting up a server on a workstation machine in response to receiving the request;
   opening the database in shared mode using the server;
   writing an IP address and a port number associated with the workstation machine to the database's access log file in response to opening the database;
   connecting the first client to the server using the IP address and port number in the database's access log file;
   receiving a request to open the database in shared mode from a second client;
   determining whether the database is already open in shared mode;
   reading the IP address and port number from the database's access log file in response to determining that the database is already opened in shared mode; and
   connecting the second client to the server using the IP address and port number in the database's access log file.

10. The method of claim 9, further comprising starting up the server on the workstation machine executing the first client.

11. The method of claim 9, further comprising starting up the server on any of a plurality of workstation machines.

12. The method of claim 9, wherein only one server may open the database at a time.

13. The method of claim 9, further comprising:
   starting up a second server on a second workstation machine in response to the server failing;
   opening the database in shared mode using the second server;
   writing an IP address and a port number associated with the second workstation machine to the database's access log file in response to opening the database; and
   connecting the first client to the second server using the IP address and port number in the database's access log file.

* * * * *